BEET TOPPING ASSEMBLY

Original Filed Sept. 29, 1965 3 Sheets-Sheet 1

INVENTOR.
ANDREW F. BARNES
BY John E. Reilly
ATTORNEY

BEET TOPPING ASSEMBLY

Original Filed Sept. 29, 1965 3 Sheets-Sheet 2

INVENTOR.
ANDREW F. BARNES
BY
ATTORNEY

BEET TOPPING ASSEMBLY

Original Filed Sept. 29, 1965 3 Sheets-Sheet 3

INVENTOR.
ANDREW F. BARNES
BY
ATTORNEY

United States Patent Office

Re. 27,695
Reissued July 3, 1973

27,695

BEET TOPPING ASSEMBLY

Andrew F. Barnes, Rte. 1, Box 295,
Longmont, Colo. 80501

Original No. 3,426,514, dated Feb. 11, 1969, Ser. No. 491,224, Sept. 29, 1965. Application for reissue Nov. 12, 1971, Ser. No. 198,393

Int. Cl. A01d *23/02*

U.S. Cl. 56—121.46 14 Claims

Matter enclosed in heavy brackets [ ] appears in the original patent but forms no part of this reissue specification; matter printed in italics indicates the additions made by reissue.

ABSTRACT OF THE DISCLOSURE

A tractor-mounted beet topping assembly includes a series of beet topping units pivotally mounted and biased independently of one another downwardly into cutting engagement with a series of beet rows, and a pick-up assembly is arranged in trailing relation to the tractor and to the beet topping units to pick up the severed beet crowns, foliage and trash, the pick-up assembly being especially constructed for multi-row topping operations in cooperation with the beet topping units and is characterized by a series of flexible finger rows on a drive tube being driven at opposite ends through one or more stripper rolls located in closely spaced relation behind the finger rows.

The present invention relates to a novel and improved machine for topping sugar beets, and more particularly relates to a tractor-mounted assembly for topping and removing the crown portions of sugar beets as well as the foliage and trash associated therewith simultaneously from a plurality of sugar beet rows.

It is a principal object of the present invention to provide for a beet topping assembly which is capable of topping and clearing multiple rows of sugar beets for example six or more rows at a time in which each row topping unit is independently adjustable according to the desired depth of cut and level of the beet crowns above the ground, substantially as set forth and described in my co-pending application for patent entitled, "Beet Topping Unit," filed May 5, 1964, Ser. No. 365,864, now Patent No. 3,343,348; and wherein a novel and improved form of spring control unit is provided for yieldingly urging the row topping units into cutting relation along the beet rows.

It is another object of the present invention to provide for an improved windrower assembly for pick-up and side delivery of the severed beet crowns, trash and foliage portions, the assembly being adjustable according to the spacing between rows and beet level for most efficient clearing and removal operations.

It is another object of the present invention to provide a beet topping assembly for multiple row topping opertions which is easily maneuverable, compact, durable and rugged in construction and wherein the assembly incorporates improved means for selectively raising and lowering the topping units as well as for yieldingly urging the topping units into proper disposition for cutting the beet crowns at the desired depth.

It is a still further object of the present invention to provide for an improved pickup assembly for simultaneously and efficiently clearing a plurality of beet rows of the severed crown portions, foliage and trash and being characterized by incorporating an improved form of support and drive mechanism for a series of flexible finger elements and being capable of controlling the attitude of each of the finger rows with respect to a closely adjacent stripper assembly utilized in association therewith to discharge the severed portions once cleared by the finger rows.

The above and other objects, advantages and features of the present invention will become more readily appreciated and understood from a consideration of the following detailed description when taken together with the accompanying drawings, in which.

Figure 1:
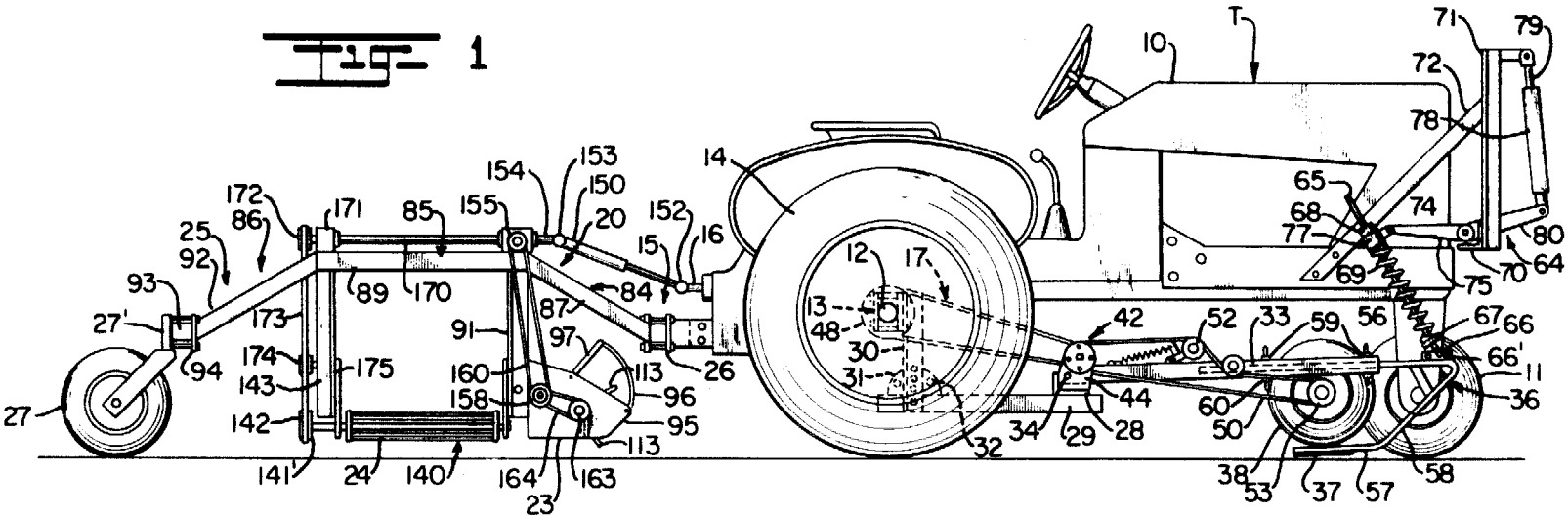
FIGURE 1 is a side elevation of a preferred form of beet topping assembly in attached relation to a conventional tractor.

The preferred form of beet topping assembly is shown in attached relation to a conventional tractor T, the tractor being defined by having a narrow elongated body or chassis 10 with a front center wheel 11 and a rear drive axle 12 being supported in a hollow frame 13 on the underside of the chassis for driving a pair of rear wheels 14 in spaced apart relation thereon. The tractor also has a pair of conventional three-point hookups generally designated at 15 with a rear power takeoff drive 16 and a front power drive 17 mounted on the rear drive axle 12 on opposite sides of the body.

Generally, the topping assembly is comprised of a series of front beet topping units 20, there being three each aligned in side-by-side relation on opposite sides of the body; yet the spacing between the six topping units is equal and corresponds with the spacing between beet rows this being accomplished by generally arranging the topping units on either side of the tractor in inwardly facing relation to one another so that the innermost topper units will project partly beneath the body of the tractor to establish the desired spacing corresponding to that between the beet rows. A windrower assembly 22 is attached in trainling relation to the tractor and includes a pickup assembly 23 aligned directly behind the units 20 to remove the severed tops or crown portions together with the trash and foliage and to discharge same rearwardly onto a side delivery conveyor 24 for piling in a row along one side of the tractor. Here the assembly generally includes a main supporting frame 25 attached by brackets 26 to two of the lifting arms on the three-point suspensions and which brackets are laterally adjustable to align the left side, that is, the operator's left side, with the left hand topping unit. Similarly, a pair of rear follower wheels 27 are adjustably connected to the rear of the support frame to aid in guiding the assembly, and the wheels are positioned to follow the furrows or ditches between beet rows.

Beet topper unit

The beet topping units preferably are attached to a transverse supporting frame 28 which in turn is attached to a pair of spaced angle frames 29 extending forwardly from a pair of vertical angle frames 30 depending downwardly from the frame 13 for the drive axle 12. A pair of semi-circular connecting plates 31 have a series of connecting holes 32, one of which is utilized on each plate for bolting the frame members 29 at a selected angle with respect to the rear axle so as to properly locate and position the supporting frame 28 according to the size and type of tractor, forwardly of the rear wheels and in spaced relation beneath the chassis. Each of the topping units is identical in construction and correspondingly mounted on the frame 28 for pivotal up and down movement by means of a pivotal frame member 33 extending forwardly from its point of pivotal connection on a shaft 34 which traverses the length of the frame 28 and each pivotal frame 33 is hollow or channeled to accommodate a knife-holder assembly 36 for a topping knife 37. The knife is preferably centered by the holder assembly in closely spaced relation beneath a finder wheel 38, each wheel 38 being mounted on a stub shaft 40 for individual rotation by means of a drive mechanism 42 extending from the main supporting fram 32 to each shaft. Mounting blocks 44 serve to support the shaft 34 for the pivotal frames 33 as well as an upper jack shaft 45 which is driven by the drive mechanism 17 for rotation of the individual drive mechanism 42 for the finder wheels. Specifically, it will be seen that the main drive mechanism 17 is suitably comprised of chain members 46 trained for advancement over the drive sprocket 47 on the rear drive axle 12 and a driven sprocket 48 on the jack shaft 45. In turn, the individual drive mechanisms 42 for each of the finder wheels is defined by a chain 50 driven by sprocket wheel 51 over a takeup sprocket 52 to a sprocket wheel 53 keyed for rotation on the drive shaft 40 for the finder wheels 38, the drive shafts 40 being journaled in bearing blocks 54 attached to the undersides of the frames 33. Most desirably, the speed of rotation of the finder wheels is increased through the drive mechanisms 42 to drive the finder wheels at a rate faster than the ground speed of the vehicle and in a direction corresponding with the forward advancement of the vehicle so as to frictionally engage the beet tops and urge them across the topping knife then to discharge them rearwardly into the path of the pickup assembly. In this relation the desirable characteristics of the finder wheel as well as the topping knife are set forth and described in detail in my hereinbefore referred to co-pending application for patent.

Figure 2:
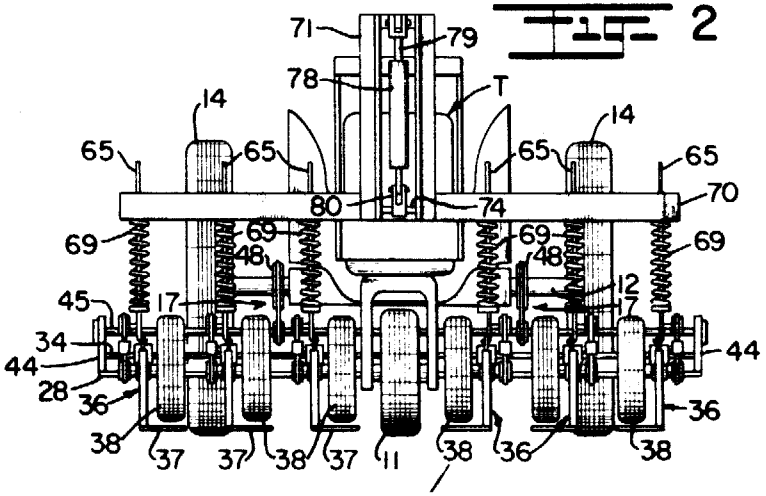
FIGURE 2 is a front view of the preferred form of invention shown in FIGURE 1.
Figure 3:
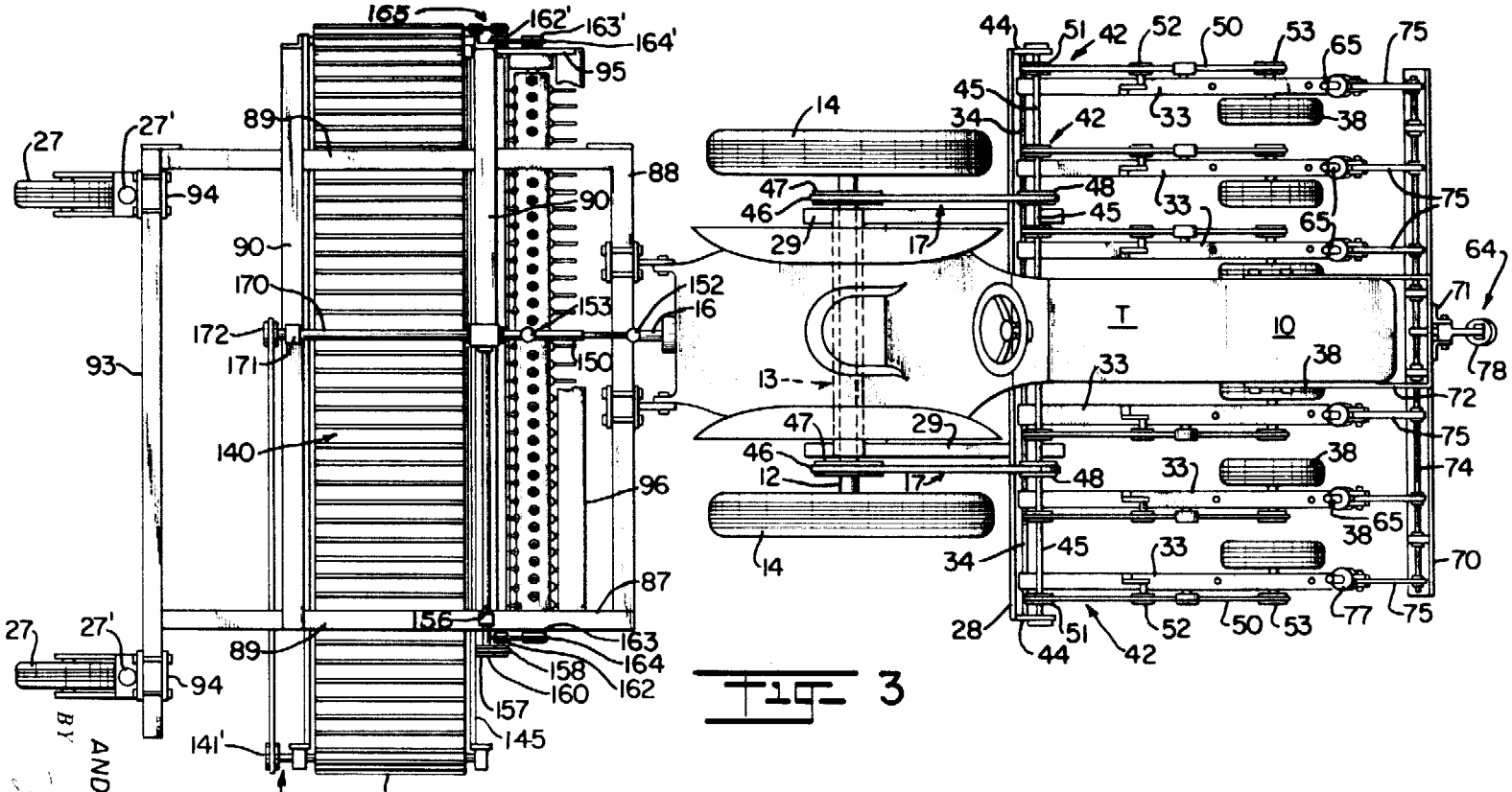
FIGURE 3 is a plan view again illustrating the preferred form of invention in assembled relation on a tractor.
Figure 6:
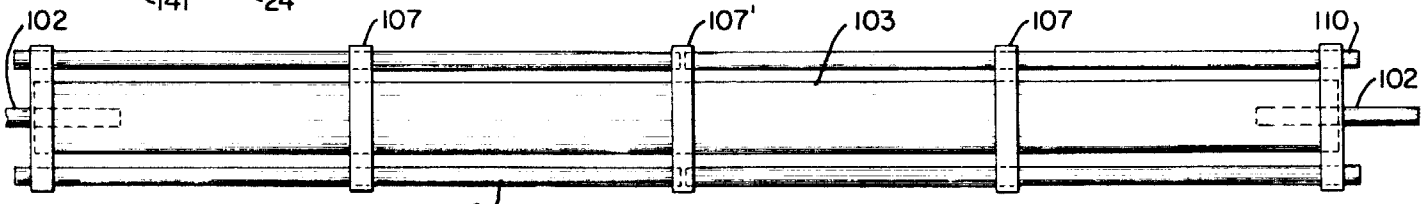
FIGURE 6 is another view in detail of the construction and mounting of parts in the pick-up head.

Now turning to the disposition and arrangement of the knife holder assembly 36, again as best seen by reference to FIGURES 1 to 3, the assembly is most desirably in the form of a one-piece, generally U-shaped bar having an upper elongated length 56 and a lower relatively short horizontal knife-supporting portion 57 interconnected by an angularly extending intermediate length 58 inclining downwardly and rearwardly from the leading end of the upper portion 56. The topping knife is secured at one end to the trailing end of the portion 57 for transverse extension in centered, but closely spaced relation beneath the lower ground-engaging surface of the wheel. To provide the necessary adjustment and support for the knife in relation to the wheel, the upper horizontal portion 56 passes rearwardly through the pivotal supporting frame 33 and is clamped therein by means of upper and lower pairs of inwardly extending adjustment screws 59 and 60 which by inward and outward threading in relation to one another will control the vertical distance between the knife and lower surface of the finder wheel as well as to regulate the horizontal disposition of the upper portion 56 within the frame.

Since the topping units are freely movable in an up and down direction the tendency will be for the knife to rest at ground level for forward advancement along the beet row and it is desirable to provide some means for resiliently or yieldingly urging the knife to remain at the proper level for cutting the crown portions of the beets exactly at ground level; and moreover, to provide some means for lifting the topping units above the beet rows as the machine is swung into position for each next series of rows. To accomplish this, a spring control mechanism 64 is mounted at the leading end of the tractor and is defined by a series of spring-biased rods 65 each being pivotally connected to a block 66 at the leading end of the knife holder assembly, each block having a series of connection holes 66' for adjusting the point of connection between each rod 65 and block according to the horizontal extension of the holder assembly from the frame. An adjustable limit stop 67 is positioned at the lower end of each rod together with an upper adjustable limit stop 68, and a coiled spring element 69 is positioned on the rod so as to bear against the lower limit stop 67. A stationary supporting frame is mounted at the leading end of the tractor and includes a cross frame 70 affixed in transverse relation across the front of the tractor with a vertical guide frame 71 supported on the frame 70 and which is reinforced by angular braces 72. The lower frame serves to support a common control shaft 74, rectangular in cross section, for a series of spring control arms 75 keyed for rotation on the shaft 74 and inclining rearwardly from the shaft for slidable connection on the rods 65 by means of collar 77 which is interposed between the upper end of the spring 69 and the upper limit stop. A remotely controlled hydraulic cylinder 78 operates through common control arm 80, also secured to the common control shaft 74, to pivot the spring control arms 75 between a lower position resting against the upper end of the spring element 69 and an upper position abutting the upper limit stops 68 to lift the entire topping units to a level above the beet rows. Through suitable pressure and return lines, not shown, leading to the hydraulic cylinder 78, the cylinder rod 79 is forced outwardly through the cylinder and the control arm 80 is pivoted downwardly to pivot the control arms 75 upwardly against the upper limit stop; or conversely by retraction of the cylinder rod 79 through the cylinder the control arm 80 is urged upwardly to force the control arms 75 downwardly against the upper end of the spring. In the latter position, as the topping units traverse the beet rows, any tendency of the topping knives to rise is resisted by movement of the spring against the collar so that the topping knife will seek its own level but nevertheless is urged downwardly to top the leaves and crown portions as close to the ground surface as possible. At the end of each row the cylinder is activated to force the spring control arms 75 upwardly against the upper limit stops 68 to lift each of the topping units off the ground as the machine is swung around into position for the next series of rows.

Windrower assembly

The windrower is mounted in trailing relation to the tractor for clearing the beet rows of the severed tops and trash prior to the subsequent beet digging operation and it is important that the assembly be capable of clearing the matter both along the beet rows and in the furrows or ditches between the beet rows in an efficient and dependable manner. Here the assembly is characterized in that the main supporting frame 25 defines a unitary overhead support for the entire assembly and specifically is made up of a forward, upwardly and rearwardly inclined frame section 84, an intermediate horizontal frame section 85 and a rearward, downwardly inclined frame section 86. It will be seen that the forward inclined frame section 84 has spaced apart beams 87 connected at their front ends to a cross-beam 88 for connection by means of the laterally adjustable brackets 26 to two of the lift arms on the three-point tractor hookups 15.

The intermediate frame section 85 has spaced apart rearwardly extending beams 89 interconnected by transversely extending front and rear beams 90 which project laterally beyond the left side of the frame; also vertical braces 91 extend downwardly from opposite terminal ends of the beams 90 for the purpose of supporting the side delivery conveyor unit 24 in spaced relation beneath the upper frame section.

The rearwardmost frame section 86 is provided with spaced apart beams 92 inclining downwardly and rearwardly from the beams 89 of the intermediate frame section and connected to a cross beam 93. A pair of brackets 94 are adjustably secured by bolts in spaced relation on the cross-beam 93, each bracket having a sleeve 93' for swivelled connection of the castors 27' for the follower wheels 27 within the sleeve. The sleeves 93' are mounted in vertically offset relation on the brackets so that by reversing the brackets on the cross-beams the sleeves may either project upwardly or downwardly from the bracket and in this way vary the vertical distance between the supporting frame 25 and the wheels 27 depending upon the depth of the furrows between beet rows.

The pickup head assembly 23 is mounted in spaced relation beneath the forward frame section 87 by attaching outer support plates 95 to the vertical braces 91 located along the front side of the intermediate frame section and at opposite ends thereof. An accurate baffle plate 96 extends transversely between the forward ends of the support plates 95 the baffle being curved upwardly and somewhat rearwardly and rigidly supported in this relation by braces 97.

Figure 4:
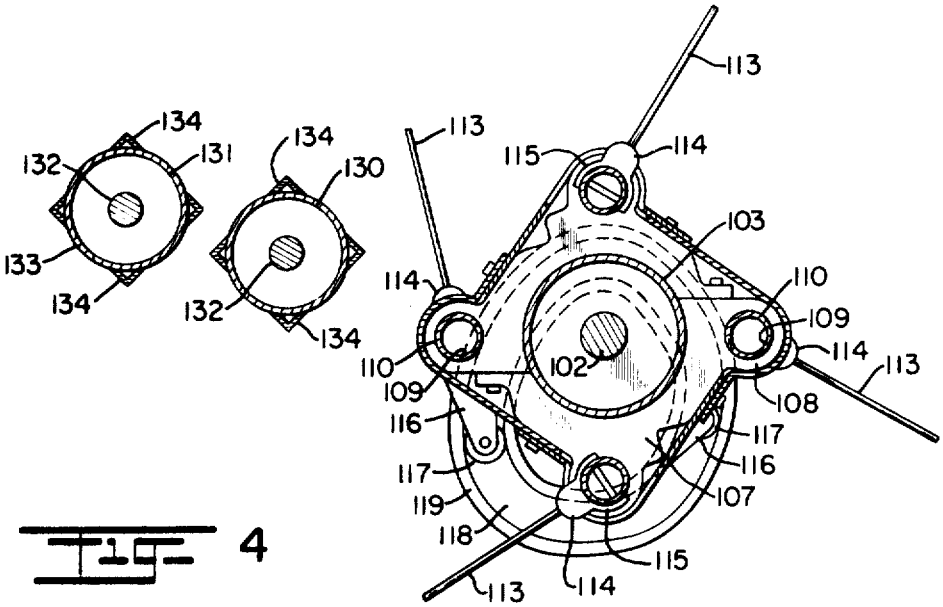
FIGURE 4 is a view in detail of the pickup head and stripper roll employed in the windrower forming a part of the beet topping assembly.
Figure 5:
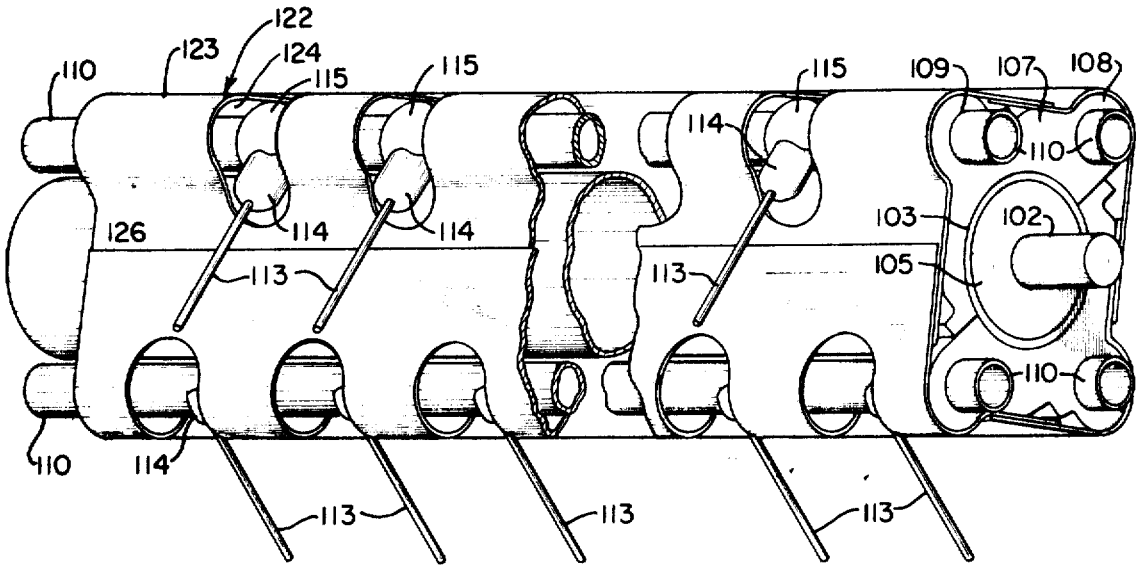
FIGURE 5 is another view in detail with portions broken away to illustrate the relative disposition and arrangement between parts comprising the pickup head.

The pickup head 100 preferably is positioned to traverse the width of the intermediate frame section or in other words to be coextensive with the transverse beam members 90 and preferably includes a pair of stub type coaxially aligned drive shafts 102 of limited length wherein each drive shaft has its outer end projecting outwardly in journaled relation through one of the supporting plates 95. A drive tube 103 of heavy-walled construction is positioned in spaced outer concentric relation to the coaxial drive shafts 102 and is affixed or mounted on the drive shafts by means of annular end plates 105 which are welded to and between the ends of the drive tube and the drive shafts. Spiders 107 are mounted at spaced intervals along the length of the drive tube and are formed with outwardly projecting lobes or ears 108 at four equally spaced circumferential intervals about the drive tube. Openings 109 are formed in the lobes 108, and the spiders are placed on the drive tube so that the openings 109 are axially aligned to receive elongated finger support rods 110. The finger support rods each consist of two coaxial rod sections which are inserted through aligned openings 109 in the spiders from opposite ends of the assembly to abut one another at a point centrally of the drive tube, and the rod sections are joined at the center of the assembly by a common spider 107'. Each of the coaxial rod sections is provided with flexible fingers 112, each finger being defined by a narrow elongated tooth element 113 with an enlarged flexible end 114 of rubber or ruber-like composition affixed to the rod with a circular clamp 115. The fingers along each rod section or row are aligned in a common plane; and in addition to following rotation of the central drive shaft and drive tube are independently rotatable within the openings 109 in the spiders, where independent rotation of each finger row is controlled by a cam follower arm 116. As seen from FIGURE 4, each follower has an outer roller 117 riding in an inwardly facing generally oval-shaped channel or track 118 formed in a cam plate 119, the latter being secured to the inner surface of each of the outer supporting plates 95 in eccentric relation to the drive shafts 102. As shown in FIGURE 5, a generally cylindrical shield or sleeve 122 is mounted in surrounding relation to the drive tube and conforms in cross-sectional configuration to that of the spiders so as to be provided with outwardly projecting longitudinal curved or convex sections 123, slotted as at 124 to permit outward projection of the fingers 112, and the convex sections 123 are separated by generally concave surfaces 126 between the finger rows.

Positioned rearwardly in closely spaced relation behind the pickup head assembly are primary and secondary stripper rolls 130 and 131, respectively, each being comprised of an inner drive shaft 132 and an outer sleeve 133 provided with external generally V-shaped ribs 134 extending lengthwise along the external surface of the sleeve and at spaced circumferential intervals, about the tube. The stripper rolls extend between the outer support plates 95 with each inner drive shaft 132 projecting in journaled relation through the plates for rotation in unison with the pickup head assembly in a manner to be hereinafter described. Essentially, the pickup head assembly is rotated in a direction counter to that of the direction of advancement of the tractor and the beet topping assembly, as are the primary and second stripper rolls, so that the flexible finger elements will pass downwardly and forwardly along the beet rows to pick up the severed beet tops and trash and to carry same upwardly then rearwardly over the pickup assembly, with the cooperation of the front baffle plate, for discharge onto the stripper rolls. It is important that the stripper rolls be positioned in closely spaced relation to one another and to the pickup head assembly so as to effectively clear and strip all the materials from the flexible fingers and, accordingly, the fingers are so controlled by the cam tracks 118 as to be rotated rearwardly toward a substantially tangential position in relation to the pickup head in order to avoid striking the primary stripper roll. For this purpose, the cam follower arms are in leading relation to the fingers and the rollers are guided by the cam tracks to swing outwardly away from the axis of rotation of the drive tube so as to fold or rotate the fingers inwardly from a normally radial position toward a tangential attitude; and under continued rotation, once past the stripper rolls, will swing inwardly to return the fingers to a radial position for the next pass along the ground surface as illustrated in FIGURE 4. Preferably periodic inward and outward swinging of the followers is accomplished as shown by locating the oval-shaped cam track 118 eccentrically below the axis of rotation of the drive tube with the circular path of travel of the finger support rods intersecting the center line of travel of the rollers through the cam track so that as each roller begins moving outside the path of the rods it will swing its associated finger row inwardly toward a tangential position; and in moving inside the path it will swing the finger row outwardly to a radial position.

The intermediate depressed or concave areas on the outer shield will cooperate in collecting the tops between the finger rows since initially the tops are thrown inwardly against the shield as they are picked up by the fingers and tend to collect within these areas in moving against the direction of travel of the vehicle; but as the top portions are carried upwardly and around the pickup head assembly, will be thrown outwardly by their own inertia as they are carried rearwardly in a direction opposite the direction of travel. The rib stripper rolls will of course augment the action of the fingers in throwing the tops rearwardly onto the side delivery conveyor 24.

The side delivery conveyor 24 is for the most part of conventional construction and generally is positioned in spaced relation behind and beneath the stripper rolls 130 and 131 to receive the severed tops discharged by the rolls and pile them in a row off to one side of the assembly. Essentially, therefore, the transverse conveyor is open-ended and has an endless conveyor chain 140 traveling on a drive sprocket assembly 141 and a series of idler sprockets which, although not shown, are positioned at transversely spaced intervals beneath the brace members 91 and across the greater width of the intermediate frame section; and one of the idler sprocket assemblies 142 is shown at one lateral extremity of the intermediate section opposite the drive sprocket assembly 141. The rear side of the conveyor area is closed by an upright longitudinal plate 143 extending the complete length of the conveyor, and a front plate 145 which is positioned in upstanding relation along the front and to one side of the pickup head assembly so that the beet crowns when deposited on the conveyor chain are constrained to move along the conveyor and to drop off the drive end of the conveyor assembly.

Drive mechanism

In the preferred form of invention, the power takeoff shaft 16 acts as the power source for the windrower assembly. To this end, a shaft 150 is connected to the rear end of the shaft 16 through a universal connection 152 and the opposite end of the shaft 150 is drivingly connected through a U-joint 153 to shaft 154 journaled in gear box 155 mounted on the top surface of the intermediate frame section.

To drive the pickup head assembly including the stripper rolls, a first shaft 156 leads from the gear box 155 transversely along the front upper beam 90 and has a sprocket wheel 157 keyed for rotation at one end thereof. A driven sprocket wheel 158 is keyed for rotation at one end of the stripper roll shaft of the primary roll 130, and a chain 160 interconnects the wheels 157 and 158 for rotation of the primary stripper roll. A sprocket wheel 162 is also mounted on the stripper roll shaft inwardly of the sprocket 158 and is in the plane of the driven sprocket wheel 163 at one end of the pickup drive shaft 102 with a chain 164 reeved around the sprockets 162–3 to drive one end of the pickup head assembly.

Correspondingly, the opposite end of the pickup head assembly is driven off the opposite end of the primary roll 130 through sprocket wheel 162' and 163' on the respective shafts and a chain 164' extends therebetween. In turn, to drive the secondary stripper roll, a chain sprocket drive 165 is positioned outwardly of the wheel 162' in driving engagement with the end of the shaft 132 on the secondary roll.

In driving the conveyor unit 24, another driven shaft 170 leads rearwardly from the gear box 155 over the intermediate frame section and through a bearing 171. A sprocket wheel 172 is keyed on the end of the shaft 170 and in the plane of the drive sprocket wheel 141' of the drive sprocket assembly 141, A takeup sprocket 174 is mounted on a bracket 175 alongside and externally of the rear guide plate 143. Although not shown, suitable cover plates may house the sprocket wheels as well as the drive and driven shafts and other associated elements comprising the drive mechanisms.

Operation

During each sweep, the beet topping machine is positioned to advance along six rows at a time and again the left hand topping unit is aligned to traverse the first or sixth row according to the direction of travel, so that the left side of the windrower is aligned directly behind the left hand topping unit. Of course, the finder wheel and topping knife for each unit are positioned to travel along the bet rows and the holder assembly of each unit is so adjusted that as the finder wheel is positively driven to engage each top, the knife will simultaneously sever the top and the wheel will discharge same rearwardly into the path of the pickup head assembly. Since the follower wheels will at the same time advance along the trenches between the beet rows the entire windrower assembly will be somewhat lower than the topper units whereby the flexible finger may clear out the entire area along and between the beet rows. It will be noted that the pickup head and stripper rolls are further rotated in a direction counter to that of the tractor and as a consequence the fingers will act to encourage upward movement of the tops through the mouth of the pickup head then against the baffle and rearwardly onto the stripper rolls for deposition on the conveyor 24. As each finger row is rotated rearwardly near its top center position, the cam followers will again be rotated inwardly to fold the fingers out of the path of the stripper rolls; then under continued rotation will rotate the fingers outwardly once past the stripper rolls to a radial position for the next sweeping operation.

At the end of each series of rows, the front powerlift cylinder is activated to raise the topper units, and simultaneously the three-point hookups are activated to raise the windrower and permit the assembly to swing around easily into position for the next sweep.

Generally, in beet topping operations, it is conventional and well-known to utilize in combination one or more topping units together with a pickup and side delivery conveyor or windrower to deposit the severed tops in a pile alongside the vehicle. In accordance with the present invention, however, multiple row topping up to six or more rows at a time is achieved, and specifically wherein a series of six topping units are mounted for forward extension in equally spaced symmetrical relation on opposite sides of the tractor body for clearing the entire path. In this relation, the drive mechanisms for the topping units and windrower assembly are geared such that with the tractor advancing at a relatively low rate of speed, the stripper rolls and pickup head may be driven at a correspondingly low rate of speed counter to the direction of travel whereby pickup and removal operations are most thorough and efficient.

Of additional importance is the particularly construction and arrangement of the pickup head assembly which in six-row topping operations will normally encounter severe bending and torsional stresses therealong, these being effectively overcome by utilization of a hollow drive tube which is driven from opposite ends, and in addition the finger support rod sections are separately controlled also from opposite ends but acting in unison to pick up and remove the beet tops. And the entire construction and arrangement of the pickup head combined with the lateral and vertical adjustability afforded independently of the topping units makes for greatly increased efficiency in clearing the entire path for subsequent beet digging operations.

It is therefore to be understood that various modifications and changes may be made in the particular combination, construction and arrangement of parts comprising the present invention without departing from the spirit and scope thereof.

What is claimed is:

1. In a beet topping machine mounted in attached relation to a tractor, a series of beet topper units including a stationary support extending transversely of the substantial width of the tracor, a plurality of pivotal support members being pivotally connected to said stationary support for *forward* substantially horizontal extension therefrom in spaced parallel relation to one another *symmetrically across the substantial width of the tractor* each of said topper units including a finder wheel and a topping knife depending downwardly from a *forward* free end of each pivotal support member, said finder wheels and topping knives being suspended from said pivotal support members at equally spaced transverse intervals and with the spacing therebetween corresponding to the spacing between beet rows, and an overhead spring control mechanism *mounted on said tractor above and forwardly of the forward free ends of said pivotal support members, said spring control mechanism* being engageable with each of said pivotal support members to yieldingly urge said finder wheel and topping knife on each pivotal support member downwardly for advancement in cutting relation along each of the beet rows.

2. In a beet topping machine according to claim 1, each of said topping knives being vertically adjustable with respect to its associated finder wheel, and said spring control mechanism including spring control means associated with each of said pivotal support members and being independently adjustable to vary the spring pressure being exerted downwardly against each of said pivotal support members.

3. In a beet topping machine according to claim 1, said spring control mechanism including a spring support member extending upwardly from the forward end of each pivotal support member and each spring support member including an upper limit stop and a lower spring element slidably positioned thereon, a control arm slidably connected to each of said spring support members, said control arms being movable between a position yieldingly engaging said spring elements to urge said topping units downwardly into cutting relation and a raised position acting against said limit stop to elevate the topping units above the beet rows.

4. In a beet topping machine according to claim 1, said stationary supporting frame extending transversely beneath the tractor, said pivotal support members being defined by hollow elongated channel members extending forwardly from said stationary frame, and knife holding means including an upper elongated section extending rearwardly through said channel, and said pivotal support members each including adjusting means to provide for vertical and horizontal adjustment of said knife holding means within each channel.

5. In a tractor-mounted beet topping machine having a series of beet topping units pivotally supported for substantially horizontal extension in equally spaced *forward* parallel relation *across the substantial width of the tractor* with each unit including a finder wheel and topping knife being independently supported for up and down swinging movement about a pivotal axis, the combination therewith of a spring control mechanism comprising a transverse control shaft supported for rotation above *and forwardly of* said topping units and traversing the width thereof, each topping unit having a spring support rod extending upwardly *and forwardly from* each unit, an outer concentric spring element at the lower end of each rod and a limit stop at the upper end thereof, control arms each being keyed at one end to said control shaft and extending from said control shaft for slidable connection with each of said support rods, and activating means being movable to rotate said control shaft between a first position in which said control arms are forced downwardly to yieldingly engage said spring elements and a raised position in which said control arms are forced upwardly against said limit stops to elevate said topping units above the beet rows.

6. In a beet topping machine according to claim 5, each of said control rods being provided with spring adjusting members for positioning said springs on said control rods in predetermined relation to said control arm thereby adjustably controlling the spring tension applied to said topping units.

7. A beet topping machine being adaptable for use in combination with a tractor, said beet topping machine comprising a series of beet topping units including pivotal supporting frames extending horizontally *and forwardly from the rear axle to a point adjacent to the leading end of the tractor* in spaced parallel relation to one another and a finder wheel and topping knife positioned at the free end of each of said pivotal supporting frames, and a spring control mechanism *at the leading end of the tractor* for yieldingly urging said pivotal supporting frames downwardly for advancement of the topping knives in cutting relation along the beet rows; and a pick-up assembly secured in trailing relation to said tractor and in aligned relation behind said topping units, said pick-up assembly including a supporting frame, a rotary drive member on said supporting frame traversing the width of said topping units and having a series of finger rows mounted thereon for picking up the beet tops severed by the topping units, at least one stripper roll disposed rearwardly in closely spaced relation behind said pick-up assembly including drive means for rotating said stripper roll, and said stripper roll being drivingly connected to opposite ends of the said rotating drive member for rotating said finger rows in a direction counter to the direction of advancement of said machine.

8. A beet topping machine according to claim 7, said pick-up assembly being further characterized by having a transversely extending rotatable drive tube serving as the rotary drive member, spiders at spaced intervals along the length of said tube, a series of flexible finger rows, each row of fingers having support rods extending through aligned openings in said spiders for rotation with said drive tube, and cam follower means at opposite ends of each support rod for rotating each of said finger rows independently of said drive tube between an extended radial position and a substantially tangential position to the path of travel of said finger rows so as to clear said stripper roll in each revolution of the finger rows past said stripper roll.

9. [In a] *A* tractor-drawn beet topping machine having a series of beet topping units including pivotal frames extending horizontally *and forwardly* in spaced parallel relation to one another *from the rear axle to a point adjacent to the leading end of the tractor* for vertical swinging movement about a transverse pivotal axis across the substantial width of the tractor and the end of each of said pivotal frames for advancement in cutting relation along the beet rows, [the combination therewith of] *a spring control mechanism at the leading end of the tractor body to yieldingly urge each of said topping units into position for topping beets along each row;* a pick-up assembly connected to said tractor for rearward extension therefrom including a support frame having laterally adjustable brackets connectable to said tractor to align said supporting frame behind said topping units, follower wheels mounted in trailing relation on said supporting frame and being transversely and vertically adjustable for advancement in spaced relation to one another between beet rows, a rotary drive tube on said supporting frame traversing the width of said topping unit, a series of flexible finger rows mounted in circumferentially spaced relation on said rotary drive tube for picking up the beet tops severed by the topping units and stripper drive rolls being disposed rearwardly in closely spaced relation behind said finger rows including drive means for driving opposite ends of said drive tube and stripper rolls in counterrotation to that of the tractor for picking up and rearwardly discharging the beet tops severed by said topping units.

10. [In a] *A* beet topping machine being adapted for use in combination with a tractor and having a series of topping units extending *forwardly* in equally spaced side-by-side relation symmetrically *across from the rear drive axle of the tractor* the substantial width of the tractor, [the combination therewith of] *a spring control mechanism at the leading end of the tractor body to yieldingly urge each of said topping units into position for topping beets along each row*, a pick-up assembly for removing the severed beet tops including a supporting frame, a transversely extending drive shaft on said frame, a drive tube carried in outer spaced concentric relation to said drive shaft and traversing the width of said frame, a plurality of outer rod support members mounted at spaced intervals along the length of said drive tube having a series of flexible finger rows including elongated support rods journaled at equally spaced, circumferential intervals on said rod support member for rotation of said finger rows with said drive tube and for rotation independently of said drive tube, stripper rolls being carried for rotation on said supporting frame including a primary stripper drive roll in closely spaced relation behind said drive tube, and cam follower arms at opposite sides of said support rods being movable in guide channels on opposite sides of said supporting frame to rotate each row of fingers independently of each drive tube between a radial position for picking up the beet tops and a substantial tangential position to clear the stripper rolls during each revolution.

11. In a beet topping machine according to claim 10, said pick-up assembly further including an arcuate baffle plate traversing the width of said drive tube and cooperating with said finger rows to discharge the severed beet tops upwardly and rearwardly onto said stripper rolls for rearward discharge therefrom.

12. In a beet topping machine according to claim 10, said pick-up head assembly further including a generally cylindrical shield being mounted in outer concentric surrounding relation to said drive tube and said rod support members, said shield being slotted at intervals for outward projection of said fingers with concave surface areas on said shield between said finger rows to cooperate in carrying the severed beet tops upwardly and rearwardly on said pick-up assembly for rearward discharge onto said stripper rolls.

13. In a beet topping machine according to claim 10, said guide channels each being of generally oval-shaped configuration, and said rotary drive tube for each finger row being eccentrically mounted in relation to said guide channels to guide movement of each of said finger rows between the radial and tangential positions.

14. A beet topping machine adapted for use in combination with a tractor of the type having an elongated narrow body mounted on a front center wheel and a rear drive axle for spaced wheels, said machine comprising a series of beet topping units including a stationary supporting frame mounted on said rear drive axle and each topping unit having a pivotal frame carried by said stationary supporting frame for forward extension in side-by-side relation symmetrically along opposite sides of the tractor body, a finder wheel and topping knife suspended from each of said pivotal frames in inwardly facing spaced relation corresponding to the spacing between beet rows, a spring control mechanism at the leading end of the tractor body to yieldingly urge each of said topping units into position for topping beets along each row; a windrower assembly for removing the severed beet tops including a support frame traversing the width of the topping units including forwardly disposed, transversely slidable brackets for connection to the tractor, and a pair of rear guide wheels being in lateral spaced relation to the rearward end of said windrower support frame, said guide wheels being laterally and vertically adjustable to ride along the space between beet rows, a pick-up head assembly including a transverse drive shaft on said support frame having an outer concentric drive tube traversing the width of said frame, rod support members mounted in spaced intervals on the external surface of said drive tube including a series of flexible finger rows having elongated support rods journaled at equally spaced, circumferential intervals on said rod support members, a pair of stripper rolls being carried for rotation on said finger rows, and cam follower arms at opposite ends of said finger support rods being movable in guide channels on opposite sides of said support frame to rotate each row of fingers independently of each drive tube between a substantially radial position for picking up the beet tops and a substantially tangential position in moving past the conveyor rolls in each revolution, an arcuate baffle plate spaced forwardly of said finger rows and cooperating with said finger rows in advancing the severed beet tops upwardly and rearwardly onto said stripper rolls for rearward discharge therefrom, and a drive mechanism operatively connected to one of said stripper rolls including drive means between opposite ends of said one stripper roll and opposite ends of said drive tube to rotate said finger rows in correlation with said stripper rolls in a direction counter to the direction of travel of said machine and a side delivery conveyor disposed on said windrower rearwardly of said stripper rolls.

References Cited

The following references, cited by the Examiner, are of record in the patented file of this patent or the original patent.

UNITED STATES PATENTS

| | | | |
|---|---|---|---|
| 2,755,614 | 7/1956 | Sishc | 56—121.46 |
| 3,010,522 | 11/1961 | Oppel | 171—58 |
| 3,306,017 | 2/1967 | Wells | 56—121.45 |
| 3,343,348 | 9/1967 | Barnes | 56—121.44 |
| 2,922,267 | 1/1960 | Rollins | 56—121.46 |
| 3,060,667 | 10/1962 | Tonsfeldt | 56—121.45 |
| 1,557,289 | 10/1925 | Huyck | 56—121.42 |
| 2,062,711 | 12/1936 | Hansen | 56—15.3 |

ANTONIO F. GUIDA, Primary Examiner